United States Patent
Nordquist et al.

(10) Patent No.: US 7,492,368 B1
(45) Date of Patent: Feb. 17, 2009

(54) APPARATUS, SYSTEM, AND METHOD FOR COALESCING PARALLEL MEMORY REQUESTS

(75) Inventors: Bryon S. Nordquist, Santa Clara, CA (US); Stephen D. Lew, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 109 days.

(21) Appl. No.: 11/339,096

(22) Filed: Jan. 24, 2006

(51) Int. Cl.
*G06F 15/16* (2006.01)
*G06F 15/80* (2006.01)
*G06F 13/00* (2006.01)

(52) U.S. Cl. ...................... 345/502; 345/531

(58) Field of Classification Search ................. 345/502, 345/531, 535
See application file for complete search history.

(56) References Cited

U.S. PATENT DOCUMENTS

| | | | | |
|---|---|---|---|---|
| 3,675,232 A | * | 7/1972 | Strout .......................... | 345/531 |
| 5,937,204 A | * | 8/1999 | Schinnerer .................. | 345/531 |
| 6,002,412 A | * | 12/1999 | Schinnerer .................. | 345/558 |
| 6,075,544 A | | 6/2000 | Malachowsky et al. | |
| 6,078,336 A | * | 6/2000 | Reynolds ..................... | 345/558 |
| 6,081,873 A | * | 6/2000 | Hetherington et al. ...... | 711/131 |
| 6,122,711 A | | 9/2000 | Mackenthun et al. | |
| 6,148,372 A | * | 11/2000 | Mehrotra et al. ............ | 711/122 |
| 6,150,679 A | * | 11/2000 | Reynolds ..................... | 257/213 |
| 6,628,292 B1 | * | 9/2003 | Ashburn et al. ............. | 345/565 |
| 6,769,047 B2 | * | 7/2004 | Kurupati ........................ | 711/5 |
| 7,275,249 B1 | | 9/2007 | Miller et al. | |
| 2004/0215944 A1 | | 10/2004 | Burky et al. | |
| 2008/0109613 A1 | * | 5/2008 | Jarosh et al. ................. | 711/154 |

OTHER PUBLICATIONS

P. A. Laplante, A Novel Single Instruction Computer Architecture, Dec. 1990, ACM SIGARCH Computer Architecture News, vol. 18 , Issue 4 , pp. 22-26.*

P. A. Laplante, An Improved Conditional Branching Scheme for a Single Instruction Computer Architecture, Jun. 1991, ACM SIGARCH Computer Architecture News, vol. 19 , Issue 4, pp. 66-68.*

* cited by examiner

*Primary Examiner*—Jeffery A. Brier
(74) *Attorney, Agent, or Firm*—Cooley Godward Kronish LLP (57) ABSTRACT

A multiprocessor system executes parallel threads. A controller receives memory requests from the parallel threads and coalesces the memory requests to improve memory transfer efficiency.

16 Claims, 13 Drawing Sheets

| Command Size | Address bits which are identical across all addresses | Address bits which are equal to thread number |
|---|---|---|
| 1 Byte | $A_{31}-A_4$ | $A_3-A_0$ |
| 2 Bytes | $A_{31}-A_5$ | $A_4-A_1$ |
| 4 Bytes | $A_{31}-A_6$ | $A_5-A_2$ |
| 8 Bytes | $A_{31}-A_7$ | $A_6-A_3$ |
| 16 Bytes | $A_{31}-A_8$ | $A_7-A_4$ |

| Command Size | Address bits which are identical across all addresses | Address bits which are equal to thread number |
|---|---|---|
| 1 Byte | $Y_{15:0}X_{15:4}$ | $X_3X_2X_1X_0$ |
| 2 Bytes | $Y_{15:1}X_{15:4}$ | $Y_0X_3X_2X_1$ |
| 4 Bytes | $Y_{15:1}X_{15:5}$ | $X_4Y_0X_3X_2$ |
| 8 Bytes | $Y_{15:2}X_{15:5}$ | $Y_1X_4Y_0X_3$ |
| 16 Bytes | $Y_{15:2}X_{15:6}$ | $X_5Y_1X_4Y_0$ |

*FIG. 13*

APPARATUS, SYSTEM, AND METHOD FOR COALESCING PARALLEL MEMORY REQUESTS

FIELD OF THE INVENTION

The present invention is generally related to the efficient use of memory in a computer system. More particularly, the present invention is directed towards servicing parallel memory requests in a multi-threaded computing system.

BACKGROUND OF THE INVENTION

There is increasing interest in General Purpose Graphics Processing Units (GPGPUs) that include a plurality of streaming multiprocessors. GPGPUs are GPUs that may also be used for other types of processing, such as image processing and scientific processing. Background information on GPGPUs and streaming multiprocessors are described in the book, *GPU Gems* 2: *Programming Techniques for High-Performance Graphics and General-Purpose Computation*, editors Matt Pharr and Randima Fernando, Pearson Education (2005), the contents of which are hereby incorporated by reference.

Advances in semiconductor technology permit a GPGPU to have a large number of computation units on a single die. As described in chapter 29 of *GPU Gems* 2, in a streaming programming model, all data is represented as a stream, where a stream is an ordered set of data of the same data type. Kernels operate on entire streams of elements. In a stream programming model, applications are constructed by chaining multiple kernels together. Since kernels operate on entire streams, stream elements can be processed in parallel using parallel multiprocessors. One model for a high performance GPU includes a task parallel organization, in that all kernels can be run simultaneously, and a data level parallelism in that data is processed in parallel computation units.

In a GPGPU having a large number of computation units the individual computation units will issue memory requests to a shared memory, such as a graphics frame buffer. However, memory controllers typically permit only a limited number of memory access sizes. Additionally, memory controllers typically provide efficient memory accesses when accessing a limited range of dynamic random access memory (DRAM) addresses at one time, such as addresses on a common DRAM page. Consequently, in some situations a GPGPU may not be capable of efficiently servicing the different memory requests of the different computation units.

In light of the above-described problems the apparatus, system, and method of the present invention was developed.

SUMMARY OF THE INVENTION

A multiprocessor system executes parallel threads. The parallel threads generate parallel memory requests. A controller performs a coalesce check and coalesces memory requests that can be accessed from memory addresses that are proximate each other on a memory page. In one embodiment, memory requests are coalesced if the addresses are from a substantially or entirely contiguous region of memory on a common memory page.

One embodiment of an apparatus includes a memory access unit for accessing a memory. The memory access unit has at least one fixed memory transfer size for accessing a memory. An array of processors supports a group of parallel execution threads. The group of parallel execution threads issues groups of simultaneous parallel memory requests on individual clock cycles. Each individual memory request has an associated access size less than the minimum fixed memory transfer size. A memory controller receives the groups of simultaneous parallel memory requests and issues memory requests to the memory access unit on the behalf of the array of processors. The memory controller coalesces each of the groups of simultaneous memory requests capable of being serviced from a substantially contiguous region of addresses of the memory to improve memory transfer efficiency. The memory controller performs a sequence of memory accesses for individual memory requests that cannot be coalesced.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
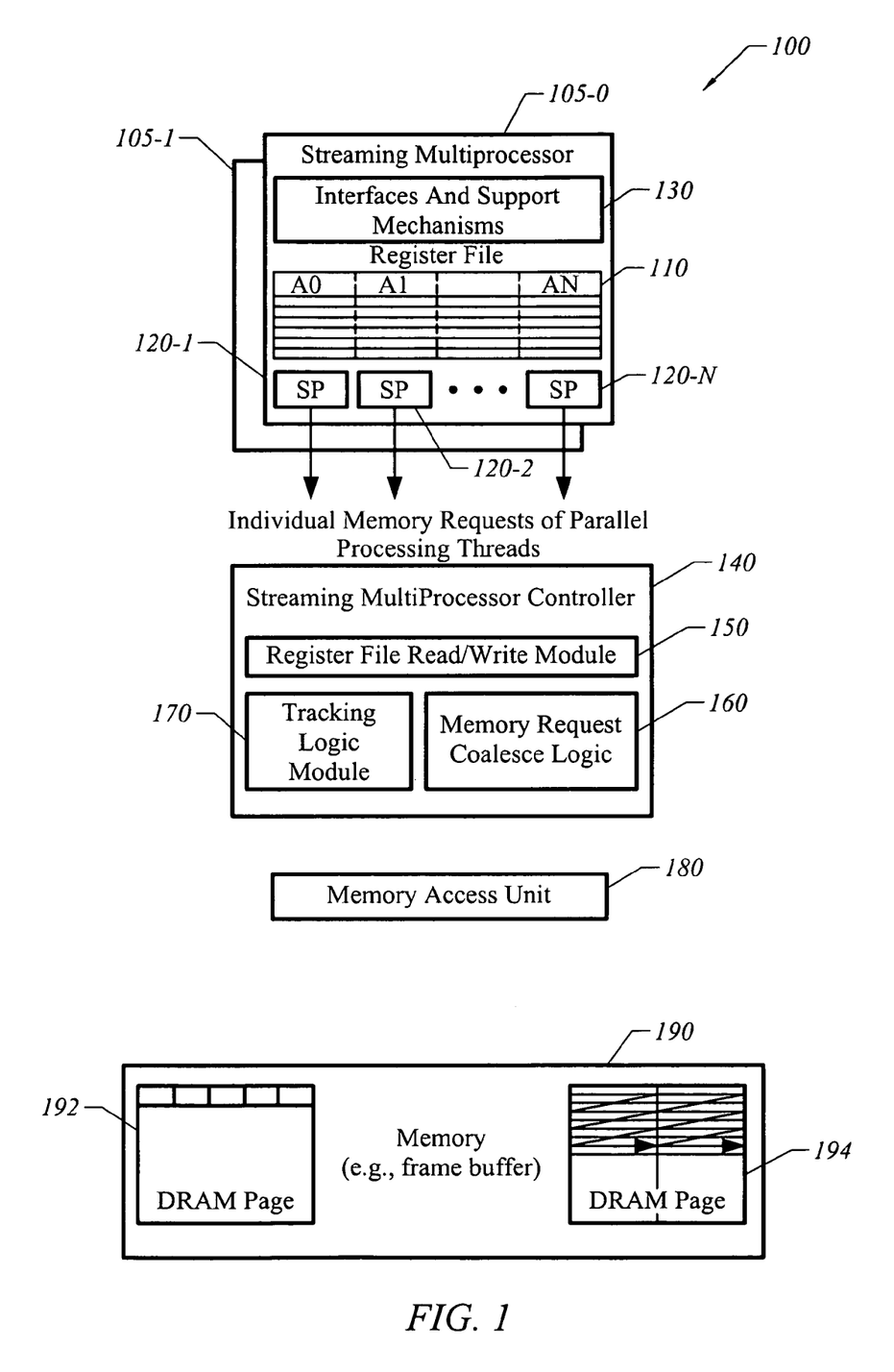
FIG. 1 is a block diagram of a streaming multiprocessor system for coalescing memory requests from parallel threads in accordance with one embodiment of the present invention.

FIG. 1 illustrates a streaming multiprocessor system 100 in accordance with one embodiment of the present invention. One application of streaming multiprocessor system 100 is as a subsystem of a graphics processing unit (GPU) (not shown)

in which an individual streaming multiprocessor executes a program supporting a processing operation of the GPU. In one embodiment, streaming multiprocessor system 100 is part of a graphics processing unit that has a unified shader architecture for performing vertex shading, pixel shading, and geometry shading. In this embodiment, an individual streaming multiprocessor 105 performs scalar operations supporting shading operations on data blocks which may correspond to two-dimensional graphics regions, such as regions of pixels.

An individual streaming multiprocessor 105-0 includes a register file 110, an integer number, N, of individual streaming processor 120, and shared resources, such as interfaces and support mechanisms 130. In one embodiment, there are sixteen individual single instruction multiple data (SIMD) streaming processors 120 capable of operating in parallel using the same program counter but processing different pieces of data concurrently on different parallel threads. Register file 110 includes data and address registers and is organized into slices designed to support load, store, and write back operations for the different individual streaming processors 120.

In some applications, streaming multiprocessor system 100 is organized as a cluster having a plurality of streaming multiprocessors, such as streaming multiprocessors 105-0 and 105-1. In one embodiment, each individual streaming processor 120 is a scalar processor. An individual streaming multiprocessor 105 supports a group of execution threads via individual streaming processors 120.

In one embodiment, a streaming multiprocessor 105 receives a stream of data block descriptors and commands from a central processing unit (not shown), including commands to launch specific computational programs performing specific computational tasks. Each streaming multiprocessor 105 supports a group of parallel execution threads. In one embodiment, an individual streaming multiprocessor 105 is assigned a cooperative thread array (CTA) to process a data block. An individual CTA has at least one thread but is more generally an array of threads that execute concurrently. A CTA program specifies a mapping between data blocks and individual threads. Each thread computes one or more result elements for the block. All of the threads of a given CTA execute on the same individual streaming multiprocessor. Computation programs are structured to run as CTAs. This permits each individual streaming multiprocessor 105-0 and 105-1 to execute the same computation programs or different programs, depending on the implementation. The threads of each CTA are cooperative in that threads of a CTA can share data and communicate with each other such that a CTA provides a means to execute a program in parallel by executing several threads in parallel. In one embodiment an individual CTA comprises an instruction program, N instances of thread state, where N is an integer, N instances of threads concurrently executing the program, N unique per-thread identifiers, and a means for sharing data and results among the N executing threads, such as a shared memory or communication network. The cooperation and communication amongst threads of the CTA allows faster and more efficient parallel algorithms.

Memory requests issued by the threads are serviced from memory 190. Examples of memory requests are load commands and store commands to access memory 190 to perform read/write operations. Memory 190 may, for example, be a conventional frame buffer implemented using dynamic random access memory (DRAM) memory. Conventionally, memory access interfaces permit memory accesses in only a limited number of byte widths, which is often much greater than the smallest possible memory request. As an illustrative example, a memory interface may permit memory accesses in 64 byte, 128 bytes, and 256 byte increments. An individual thread may, for example, only access data in small increments, such as 32 bits, 64 bits, or 128 bits. As result, it is inefficient to use the whole byte width of a memory interface to access a small amount of data for an individual thread. Moreover, an efficient access of DRAM memory typically requires accessing memory within a limited range of column, row, and bank addresses that may be accessed in a DRAM burst mode. DRAM memory is most efficiently accessed from a common DRAM page, preferably from a range of contiguous addresses on the same DRAM page. While DRAM memory can be accessed from non contiguous regions, it is well known in the memory art that this results in various performance penalties.

In one embodiment, memory requests associated with individual threads specify memory addresses in address registers, whether a load or store operation is to be performed, and the data size associated with the request. In one embodiment, two or more different memory sizes are supported for individual memory requests.

In accordance with one embodiment of the present invention, memory transfer efficiency is improved by including a streaming multiprocessor controller 140 to coalesce memory requests from different parallel processing threads. Streaming multiprocessor controller 140 issues memory requests on the behalf of streaming multiprocessor 105 to memory access unit 180. Memory access unit 180 may, for example, include a conventional memory controller and interface for accessing DRAM memories. Streaming multiprocessor controller 140 identifies and coalesces parallel memory requests having a sufficiently narrow range of memory addresses on a common memory page (e.g., nearly or completely contiguous address regions) such that memory transfer efficiency is improved (i.e., the number of memory accesses that must be used to perform load or store operations for a group of threads is reduced). Streaming multiprocessor controller 140 receives the memory requests of the parallel threads of individual streaming multiprocessors 105. In one embodiment, streaming multiprocessor controller 140 includes a register file (RF) read/write module 150 to perform read/write operations on register file 110, a memory request coalesce logic module 160 to check which memory requests may be coalesced and serviced from a range of addresses within common DRAM pages, and a tracking logic module 170 to track outstanding memory requests. In one embodiment, tracking logic module 170 includes a tagger to generate tags to track outstanding memory requests.

In one embodiment, intra-burst coalescing of memory requests is performed. A minimum memory transfer size corresponds to a bus width. For a memory having a burst mode memory cycle, the minimum efficient memory transfer size is the bus width multiplied by the burst size. A memory page corresponds to the bus width multiplied by a memory device page size. For intra-burst coalescing, small parallel memory access requests (e.g., 8-bit, 16-bit, 32-bit, or 64-bit) are opportunistically coalesced up to a minimum efficient transfer size where the minimum efficient transfer size corresponds to the memory bus width times the burst size. Note that an individual burst corresponds to a contiguous region of a memory page. Moreover, a burst will typically cover a comparatively small region of one memory page. Consequently, for intra-burst coalescing, memory requests that are coalesced up to a minimum efficient memory transfer size will have addresses within a contiguous region of a common page.

The design of the computer program executed by the parallel threads is preferably selected in combination with the DRAM memory format to facilitate coalescing memory requests to access contiguous regions of DRAM memory. It is desirable to store graphics data in DRAM memory in a manner that preserves some of the inherent spatial relationships of the graphics data within individual DRAM pages to facilitate efficient memory accesses for data processed for specific spatial regions. Graphics data often has an inherent order with respect to screen coordinates. In particular, graphics data may be processed in a scan line order or in blocks with respect to screen coordinates. For example, a group of threads may be assigned a computational task on a data block corresponding to processing vertices, primitives, or pixels covering a selected range of pixel locations for a scan line or a two-dimensional region. Consequently, storing data in a memory format having a similar spatial relationship to the graphics data being processed increases the likelihood that memory requests can be coalesced in a manner that improves memory transfer efficiency. As one example, data in memory 190 may be stored in a memory format preserving a scan line order 192 of memory addresses on individual DRAM pages. In particular, data may be stored in rows in what is often know as a "pitch" layout. As another example, data may be stored in blocks such as a block-linear memory format 194 on a DRAM page having an order for proceeding along DRAM addresses in blocks, sub-blocks, and in rows within sub-blocks. That is, the block-linear memory format specifies a left-to-right, top-to-bottom, and side-to-side sequence for proceeding between blocks/sub-blocks and an order for proceeding linearly along address rows, as indicated by the arrows. A block-linear format is particularly useful for preserving spatial relationship associated with processing graphics data in blocks and sub-blocks. In one embodiment the memory format 192 or 194 may be selected by the threads, i.e., the memory format is selected to have the best spatial correspondence to the manner in which graphics data is being processed.

In one embodiment, the instruction set for the threads includes load and store operations to globally shared memory regions. Since the threads operate in parallel, all of the threads may issue a load or store command on the same clock cycle to the same DRAM page, particularly if, as previously described, the DRAM memory layout is chosen to have a spatial layout corresponding to the graphics data being processed in parallel. Thus, as a particular program executes on parallel threads there may be some clock cycles in which the parallel threads simultaneously issue memory requests within a comparatively narrow range of memory addresses proximate to each other on the same DRAM page. Moreover, in some cases the memory requests may correspond to a nearly or completely contiguous region of memory addresses on a common DRAM page. However, note that streaming processors 120-1 to 120-N are independent units. Additionally, the streaming multiprocessor 105 may be assigned different programs. Consequently, there may also be clock cycles in which the threads issue load or store requests directed to different regions of memory such that at least some memory requests cannot be coalesced.

Figure 2:
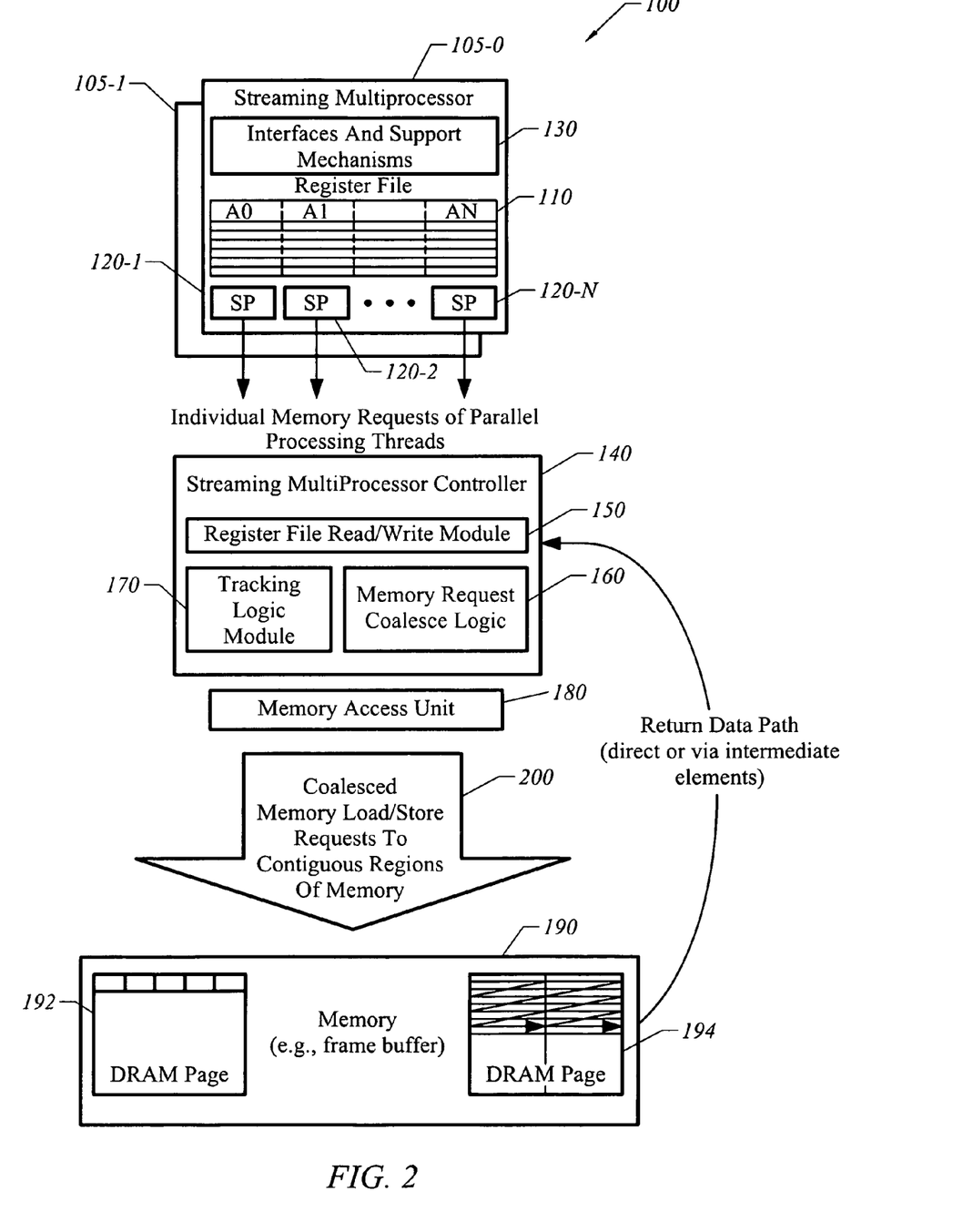
FIG. 2 illustrates the coalescing of memory requests by a controller in the system of FIG. 1.

FIG. 2 illustrates an example in which memory load or store commands are coalesced by streaming multiprocessor controller 140. As indicated by arrow 200 a group of memory requests from different parallel threads are coalesced into one coalesced memory request 200 directed to a contiguous or nearly contiguous region of memory, such as a range of addresses proximate to each other on an individual DRAM page. Coalesce logic module 160 performs a coalesce check to verify that the addresses of individual memory requests correspond to a contiguous region or a nearly contiguous region of memory. As one example, for a pitch format 192 (corresponding to a sequence of horizontal scan lines), a byte offset (e.g., a fixed byte offset) may be checked to verify that each memory request has an address that is on the same row of addresses on a DRAM page but offset with respect to each other along a single row of addresses. For example, if each memory request has a data width of 4 bytes, coalesce logic module 160 may check that each memory request of a group of parallel threads is offset with respect to each other by 4 bytes along a common row of memory addresses. In this example, if each memory request is 4 bytes and there are sixteen threads then a successful coalescing operation permits a 64 byte memory access to performed to a common DRAM page to access data for all sixteen threads. The preferred case is that all of the memory requests are to a contiguous region of memory since this provides the greatest improvement in transfer efficiency in regards to reducing the number of accesses that must be made to memory. However, it will be understood that there is a benefit if the total number of accesses is reduced by coalescing a subset of all of the memory requests. For example, rules may be included in coalesce logic module 160 to coalesce two or more memory requests sufficiently close on the same DRAM page such that there is an improvement in memory transfer efficiency compared with issuing the requests as sequential requests.

As another example, in a block-linear format 194, an address mapping technique may be used to check that the addresses of the memory requests of parallel threads are offset from each other and traverse a specified region in the address space of a DRAM page. In one embodiment, all of the addresses of the memory requests of parallel threads must correspond to a contiguous region of memory in order for the requests to be coalesced. More generally, however, coalesce logic module 160 may perform a coalesce check in which it determines the largest number of memory requests having a range of DRAM addresses on a common DRAM page that can be accessed efficiently in a single memory access.

Figure 3:
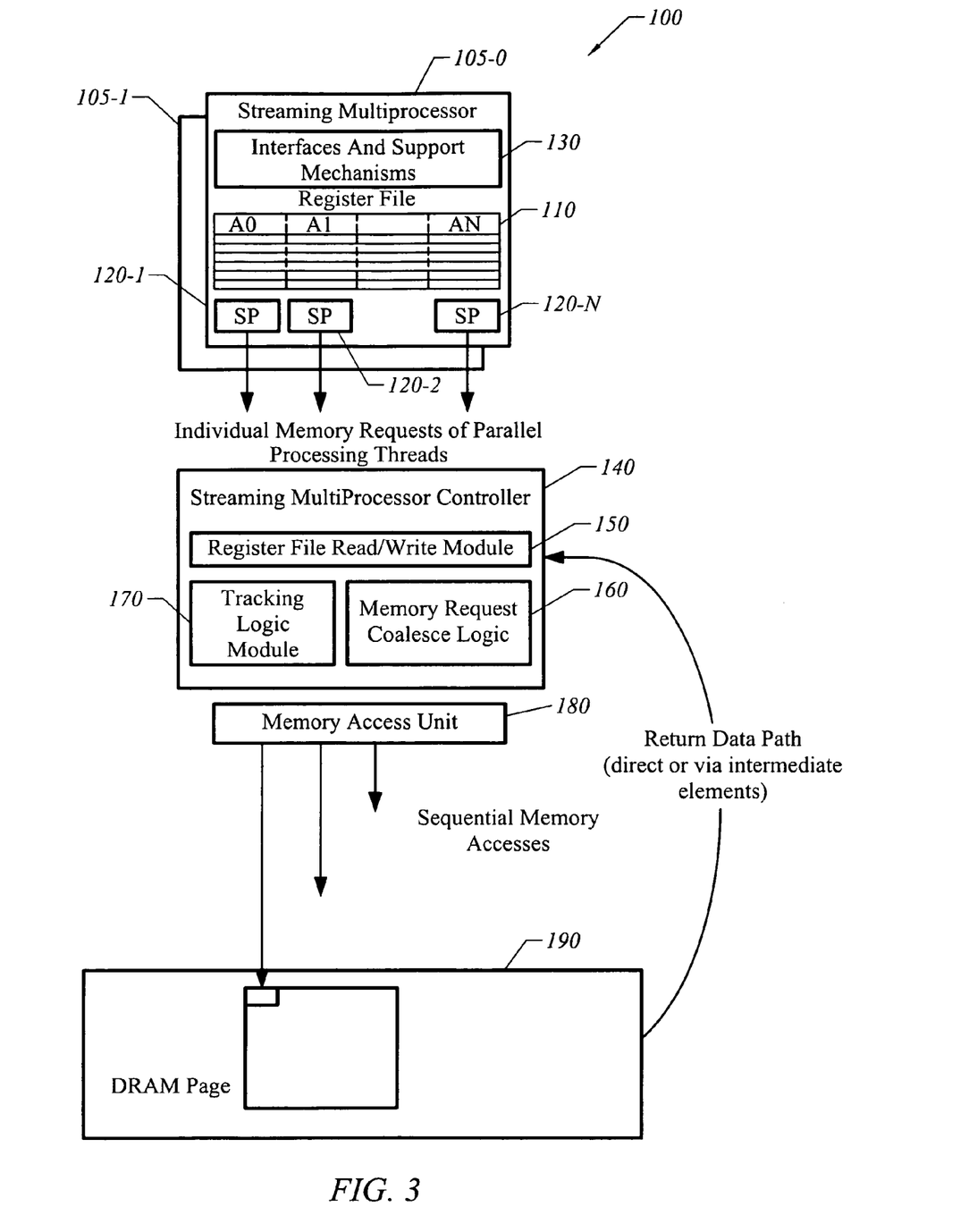
FIG. 3 illustrates the system of FIG. 1 issuing sequential memory requests for memory requests that cannot be coalesced.

As illustrated in FIG. 3, those memory requests which cannot be coalesced in a manner that improves memory transfer efficiency are issued as sequential memory accesses on different clock cycles. Thus, in one embodiment of the present invention memory requests are coalesced whenever practical to improve memory transfer efficiency but as a backup sequential memory accesses are performed for those memory requests that cannot be efficiently coalesced. Streaming multiprocessor controller 140 may, for example, include a local storage buffer to support issuing memory accesses in a sequential order.

Figure 4:
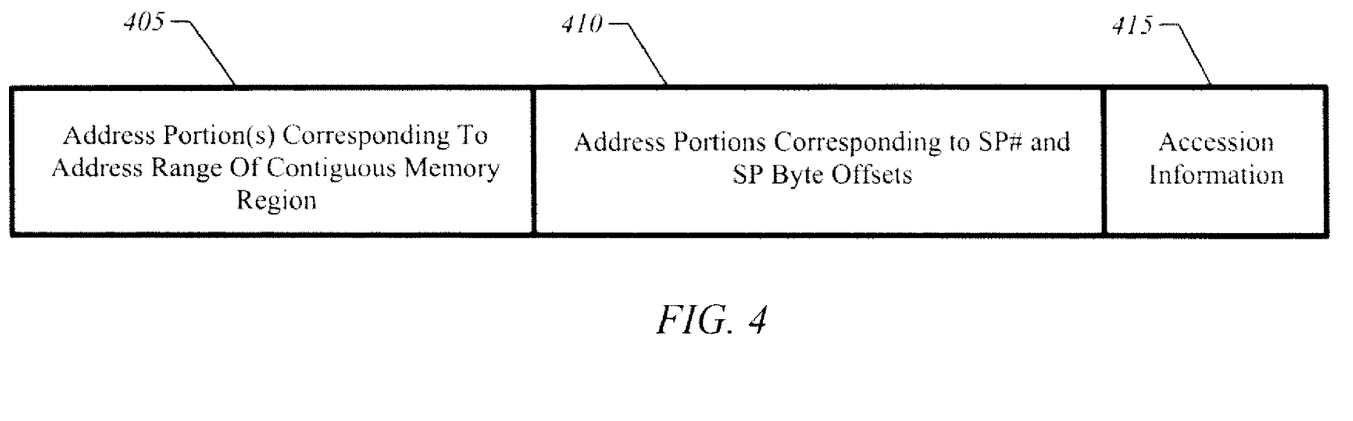
FIG. 4 is a high level diagram illustrating how address portions of a memory request are used to identify memory requests capable of being coalesced in accordance with one embodiment of the present invention.

FIG. 4 is a high level diagram of register addresses associated with a memory request for an individual thread. The addresses of an individual memory request can be analyzed by coalescing logic module 160 as three portions. In order for individual memory requests to be coalesced, one or more portions of the memory address must correspond to an address range of a contiguous memory region 405 on a single memory page. Consequently, a number of bits will be identical or within a prescribed range such that the addresses of different threads are proximate each other and on the same memory page. For example, for a pitch memory format, all memory requests capable of being coalesced lie along the same row of addresses and will thus have a common address portion corresponding to the common row. For a block linear format a mapping technique may be used to map ranges of x and y portions of memory addresses to a range of addresses in the block-linear memory format.

A portion 40 of the address of the memory request corresponds to a byte offset for the different threads of each streaming processor (SP) 120. That is, in order for the memory requests to be non-overlapping and proximate to each other (i.e. preferably in a contiguous region of memory addresses) each of the addresses of the memory requests for different threads must be offset from each other by an amount that depends on the memory access size. In a pitch memory format a simple byte offset may be checked. For a block-linear format a bit swizzling or concatenation technique may be used to verify that the memory requests of different threads have proper byte offsets within the block-linear format.

Additionally, a portion of the memory address may correspond to accession information 415 describing access information. For example, the bits of the accession information 415 may provide information describing the memory format to be utilized (e.g., scan line format or block linear format).

Figure 5:
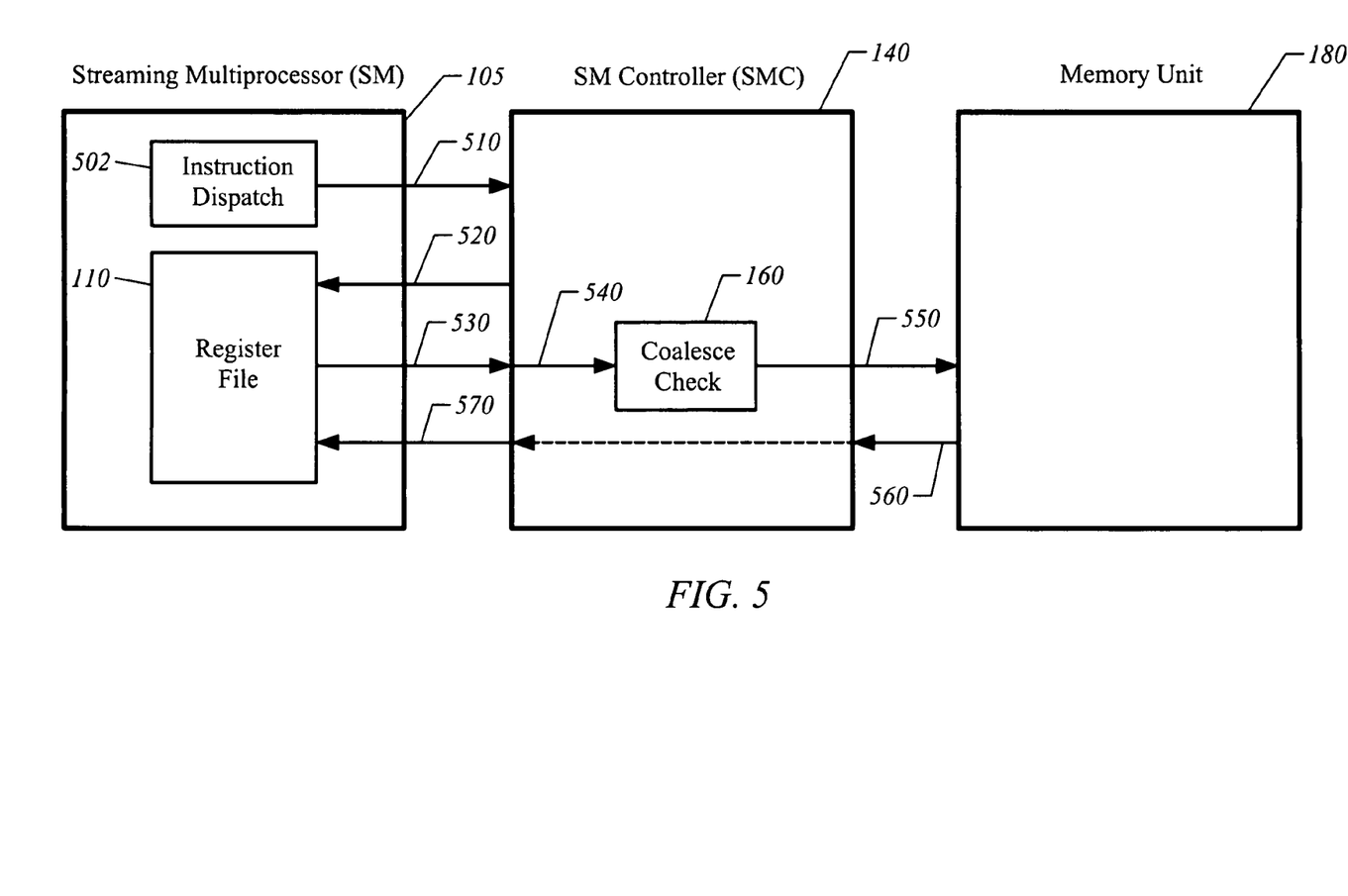
FIG. 5 illustrates an exemplary sequence of interactions in a load operation in accordance with one embodiment of the present invention.

FIG. 5 is a block diagram illustrating an exemplary load operation. As illustrated by arrow 510, streaming multiprocessor 105 executes a load command and sends a load request to the streaming multiprocessor controller 140 via an instruction dispatch unit 502. In response, as illustrated by arrow 520, the streaming multiprocessor controller 140 sends a read request for the address register. In one embodiment, the request is for one 32-bit register for each of sixteen parallel threads. As illustrated by arrow 530, the streaming multiprocessor 105 then sends the addresses from the address registers to the streaming multiprocessor controller 105. Thus for example, if there are 16 parallel threads and 32 bits per address the streaming multiprocessor controller 140 receives all sixteen address registers in parallel for a total of 512 bits. As illustrated by arrow 540, streaming multiprocessor controller 140 then sends the addresses to coalesce logic 160 to perform a coalesce check. The streaming multiprocessor controller 140 then sends memory load requests to memory access unit 180, as illustrated by arrow 550. If the coalesce check passes, the streaming multiprocessor controller 140 sends one or more coalesced memory load requests to memory access unit 180. If the addresses cannot be coalesced, one load request per active thread is sent to memory. The memory access unit 180 loads the data and sends it to the streaming multiprocessor controller 140, as indicated by arrow 560. The streaming multiprocessor controller 140 then forwards 570 the data to the register file of the streaming multiprocessor 105.

Figure 6:
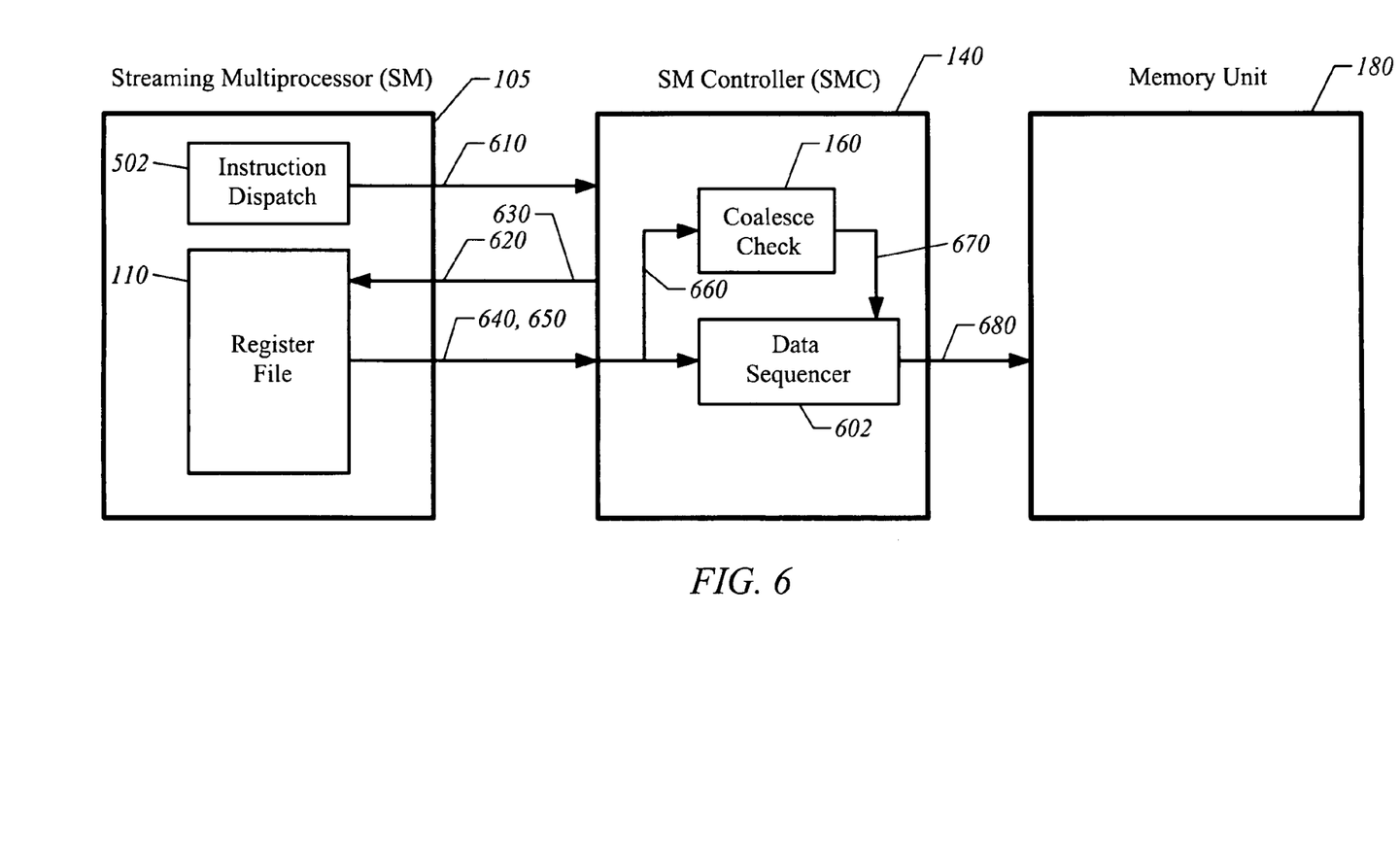
FIG. 6 illustrates an exemplary sequence of interactions in a store operation in accordance with one embodiment of the present invention.

FIG. 6 is a block diagram illustrating an exemplary store operation. As illustrated by arrow 610, streaming multiprocessor 105 executes a store command and sends a store request to streaming multiprocessor controller 140. The streaming multiprocessor controller 140 then sends a read request 620 for the address register for each thread, such as one 32-bit register for each of sixteen threads. The streaming multiprocessor controller 140 also sends one or more read requests 630 for the store data. For example, each request may be for one 32-bit register for each of 16 parallel threads and may, for example, comprise one, two, or four read requests. As indicated by arrow 640, the streaming multiprocessor 105 then sends the address registers to the streaming multiprocessor controller 140. The streaming multiprocessor controller 140 receives the address registers in parallel. As indicated by arrow 650, the streaming multiprocessor 105 also sends the data registers to the streaming multiprocessor controller 140, e.g., one register for each of the parallel threads per transaction although the total data transfer may include several transactions such as one, two, or four transactions. The streaming multiprocessor controller 140 then sends the addresses to coalesce logic 160 to perform a coalesce check, as indicated by arrow 660. The results of the coalesce check are sent to a data sequencer 602, as illustrated by arrow 670. The streaming multiprocessor controller 140 then issues one or more memory store requests to memory access unit 180. If the coalesce check passes, the streaming multiprocessor controller 140 issues coalesced memory requests, such as one or two coalesced memory requests. If the addresses cannot be coalesced, one store request is sent per active thread.

Figure 7:
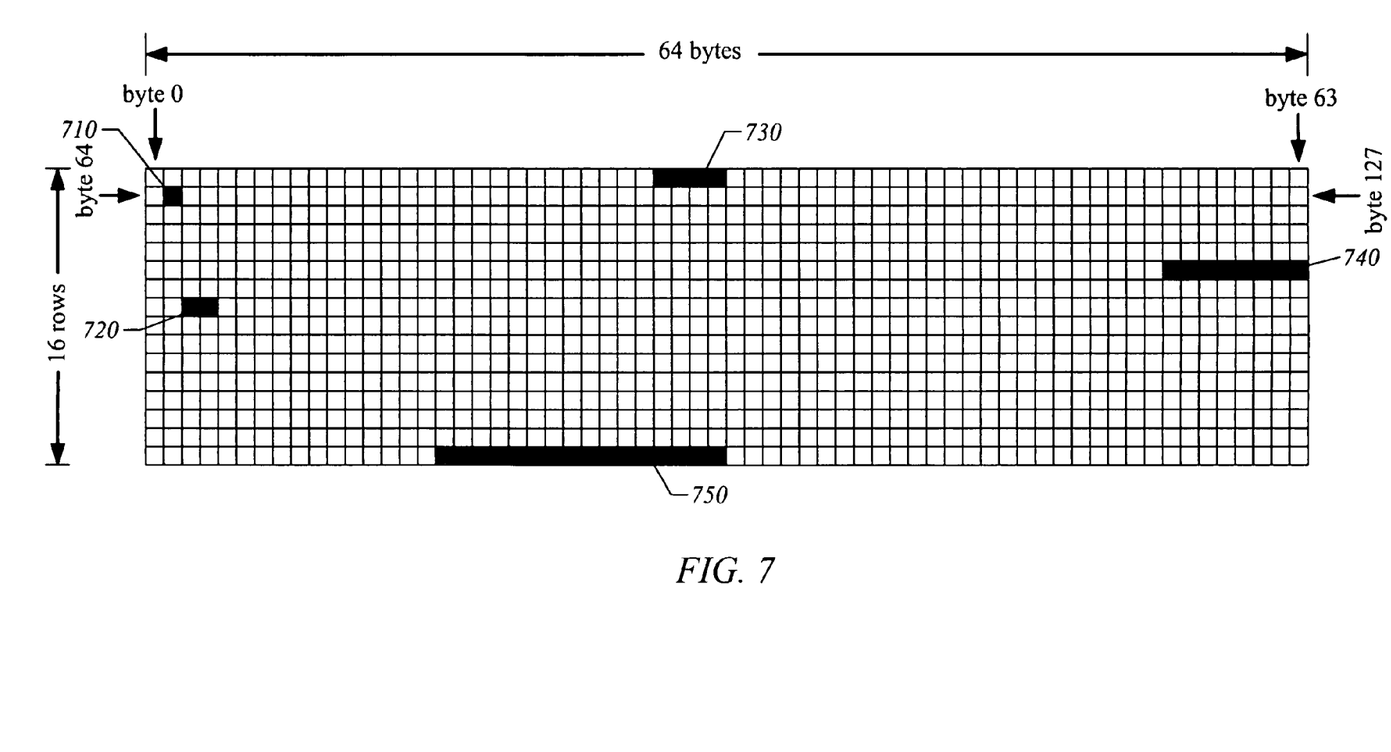
FIG. 7 illustrates an exemplary pitch memory layout in accordance with one embodiment of the present invention.

FIG. 7 illustrates an exemplary pitch memory layout of a DRAM page. A two-dimensional graphics region is stored in memory as consecutive rows. Memory byte addresses increase from left to right in a single row and then down to the next row. The number of bytes in a single row is called the pitch. In this example, the pitch is 64 bytes and there are 16 rows. Exemplary memory accesses of different sizes are indicated by the shaded bytes. A one byte memory access 710 can have any byte alignment. A two byte memory access 720 must have an address aligned to two bytes. A four byte memory access 730 must have an address aligned to four bytes. An 8 byte memory access 740 must have an address aligned to eight bytes. A 16 byte memory access 750 must have an address aligned to sixteen bytes.

Figure 8:
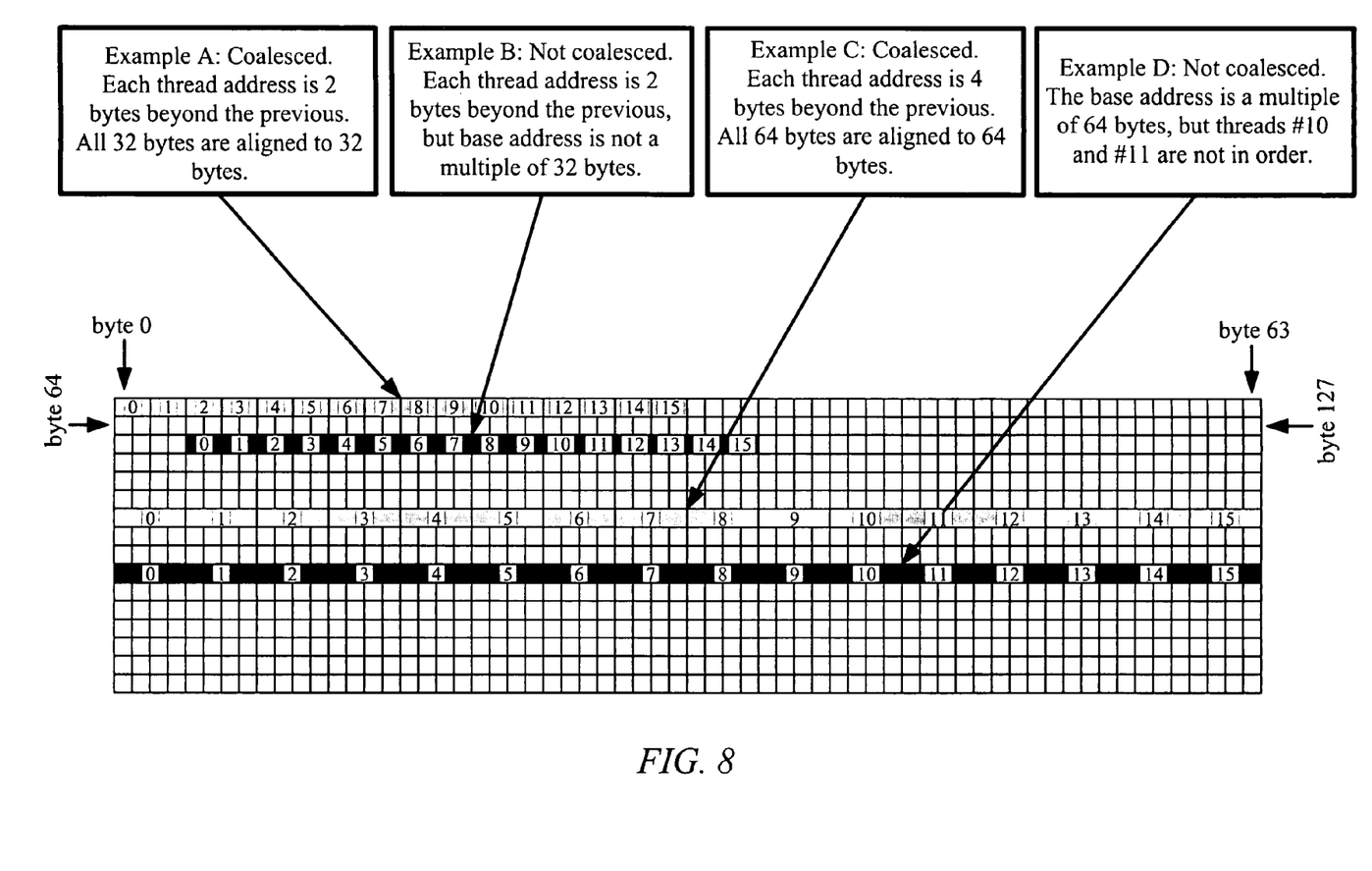
FIG. 8 illustrates examples of coalescing checks performed on different parallel memory requests for a pitch memory layout in accordance with one embodiment of the present invention.

FIG. 8 illustrates examples of coalescing in the pitch layout of FIG. 7. In this illustrative example address registers are treated as 32-bit byte addresses. These byte addresses must be aligned to the size of the load/store command. For example, if the load/store command is for two bytes, the bottom bit of the address register must be zero in order to be aligned. In one embodiment one condition that must be satisfied is that to coalesce pitch addresses each address must be of the form: BASE+(SIZE×Thread_Id), where BASE is the base address of a thread number zero, SIZE is the size of the load/store command (e.g., 1, 2, 4, 8, or 16 bytes), and Thread_Id is a value from zero to fifteen identifying one of the sixteen threads. In one embodiment a second condition that must be satisfied is that the threads are in a sequential order with respect to the memory addresses, that is the byte address progresses sequentially with thread number. In one embodiment a third condition is that the memory accesses are compatible with acceptable transfer sizes and alignment. In one embodiment memory accesses of thirty-two bytes, sixty-four bytes, and one-hundred and twenty-eight bytes are permitted. In the example of FIG. 8, a thirty-two byte access corresponds to half of a row and sixty-four bytes corresponds to a full row. As a result, only coalescing operations which are compatible with transferring an aligned half row, a full row, or multiple full rows are possible.

Figure 9:
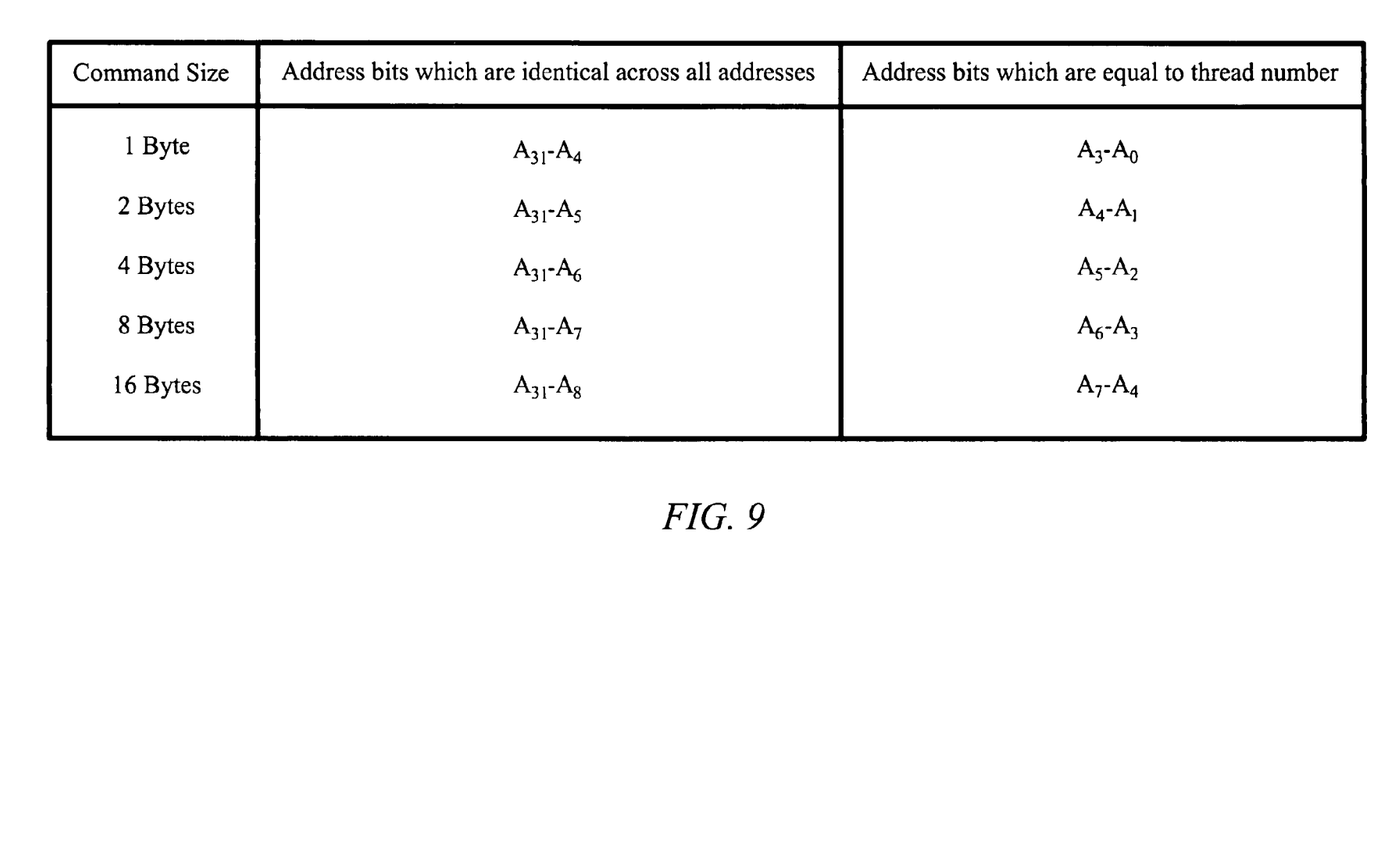
FIG. 9 is a table illustrating coalesce check rules for different memory command sizes for a pitch memory layout in accordance with one embodiment of the present invention.

FIG. 9 illustrates exemplary coalesce checks for different command sizes in a 32-bit address implementation of a pitch memory layout. Parallel addresses of a load/store command can be coalesced if a subset of the address bits are identical across all of the addresses and a subset of the address bits, treated as a binary integer, are equal to the thread number associated with the thread address. In one embodiment a disabled thread also automatically passes the coalesce check.

Figure 10:
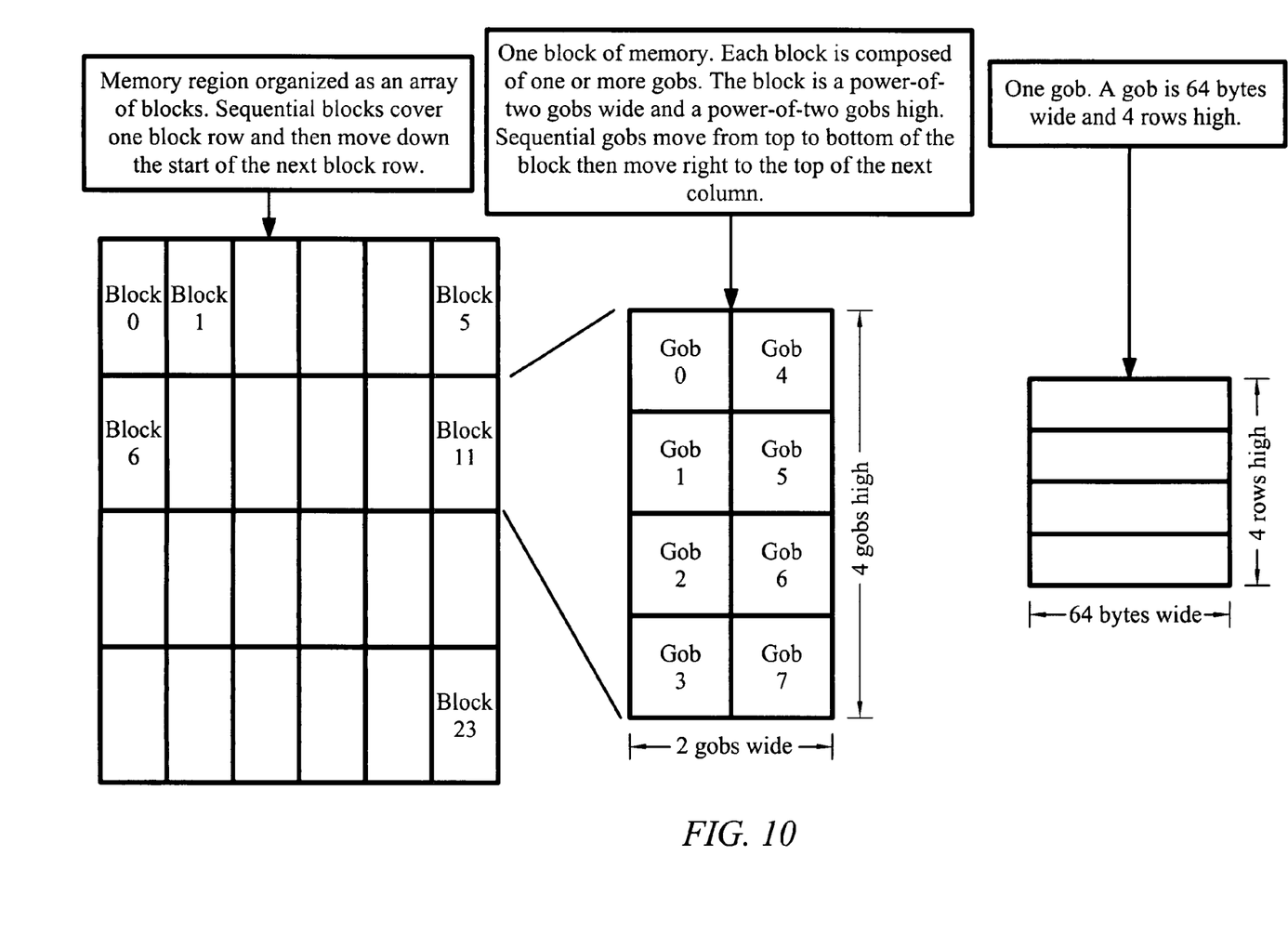
FIG. 10 illustrates an exemplary block-linear memory format in accordance with one embodiment of the present invention.

FIG. 10 illustrates an exemplary block-linear memory layout. A two-dimensional region is stored as a two-dimensional array of blocks. Each block is organized as a number of sub-blocks called a "gob." In one embodiment, each gob has a pre-selected number of rows. In one embodiment, a gob is 256 bytes wide organized as 4 rows of 64 bytes.

Figure 11:
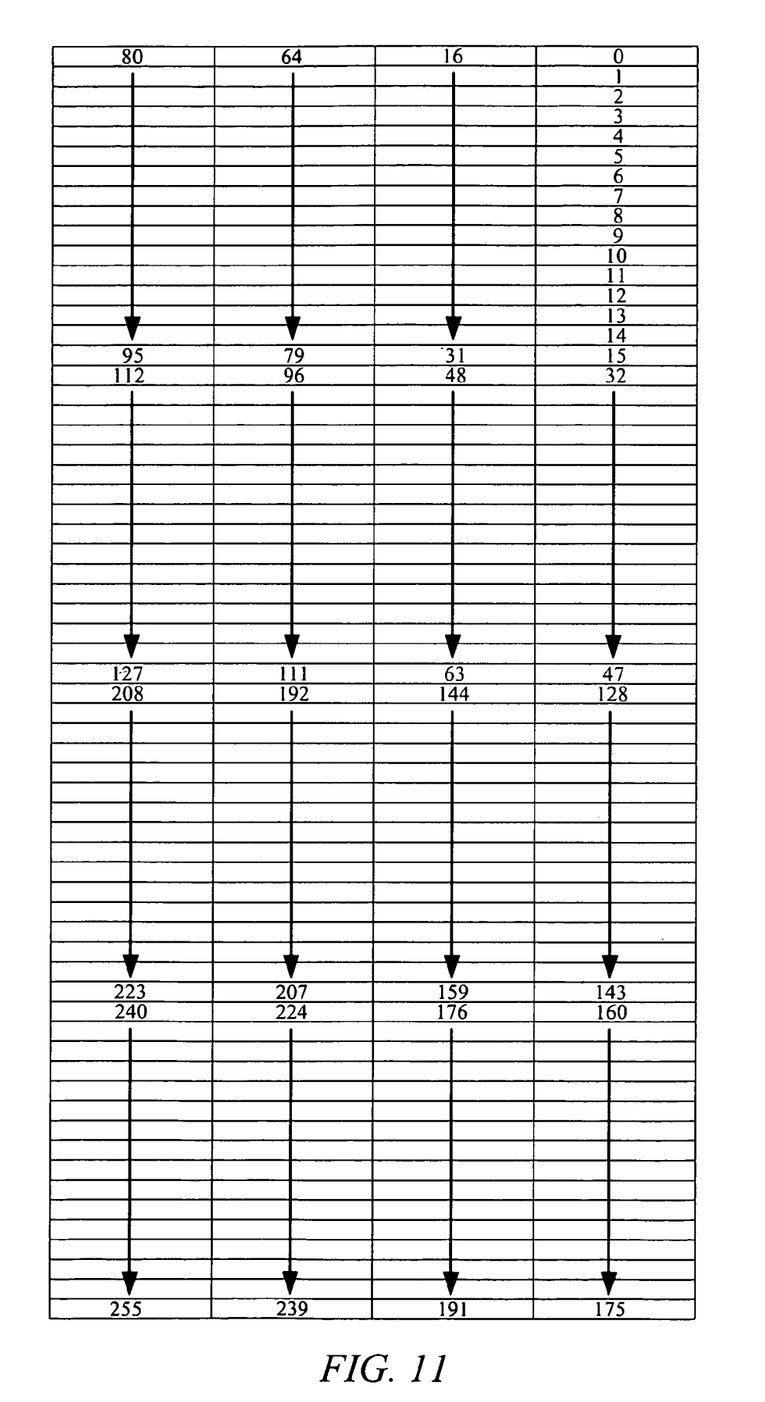
FIG. 11 illustrates the organization of a gob memory sub-block in accordance with one embodiment of the present invention.

FIG. 11 illustrates an exemplary organization of bytes within a gob. In one embodiment, each gob is 256 bytes, arranged as four rows. Each row is 64 bytes wide, with the bytes arranged in the zig-zag pattern illustrated in FIG. 11.

Figure 12:
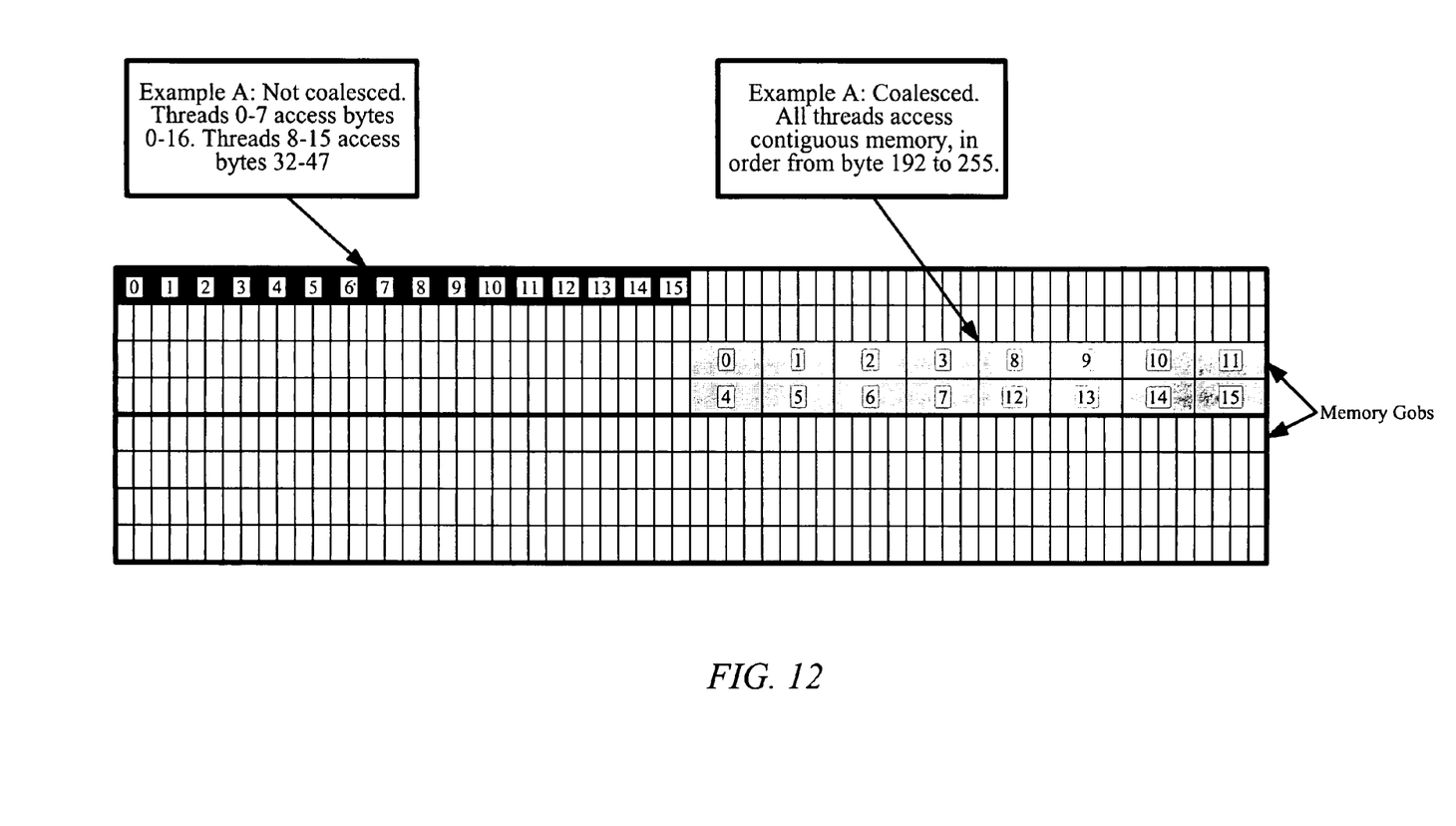
FIG. 12 illustrates examples of coalescing checks performed in a block-linear memory format in accordance with one embodiment of the present invention.

FIG. 12 illustrates an exemplary coalesce check for the block-linear layout of FIGS. 10 and 11. In this example, address registers are treated as two-dimensional coordinates. For a 32-bit address, the lower 16 bits of the address register are treated as the x coordinate having units of bytes. The upper 16 bits of the address register are treated as the y coordinate having units of rows. The x coordinate is aligned to the size of the load/store command. For example, if the load/store command is for 4 bytes, the bottom two bits of the x coordinate must be zero. For a hexadecathread implementation (i.e., sixteen parallel threads) the hexadecathreads must conform to the gob memory organization. Each thread accesses memory at a location that is SIZE bytes beyond the next previous thread, where SIZE is the size of the load/store command, i.e., one, two, four, eight, or sixteen bytes. As previously described, the memory access size may be 32 bytes, 64 bytes, or 128 bytes. In order for a group of threads to pass a coalesce check, the addresses must also be aligned with respect to multiples of a memory access size and be capable of being transferred using an integer number of transfers (e.g., one or two transfers). A memory access size of 32 bytes corresponds to half of the width of a 64 byte row of a gob whereas 64 bytes corresponds to a full row of the gob. The starting address of a coalesced request must be aligned with respect to the transfer size. For example, if each thread loads four bytes and there are 16 threads, a coalesced request would have a total size of 16 threads×4 bytes=64 bytes. However, the starting address must be a multiple of 64 bytes in order that all 64 bytes can be transferred across the memory interface in a single access.

Figure 13:
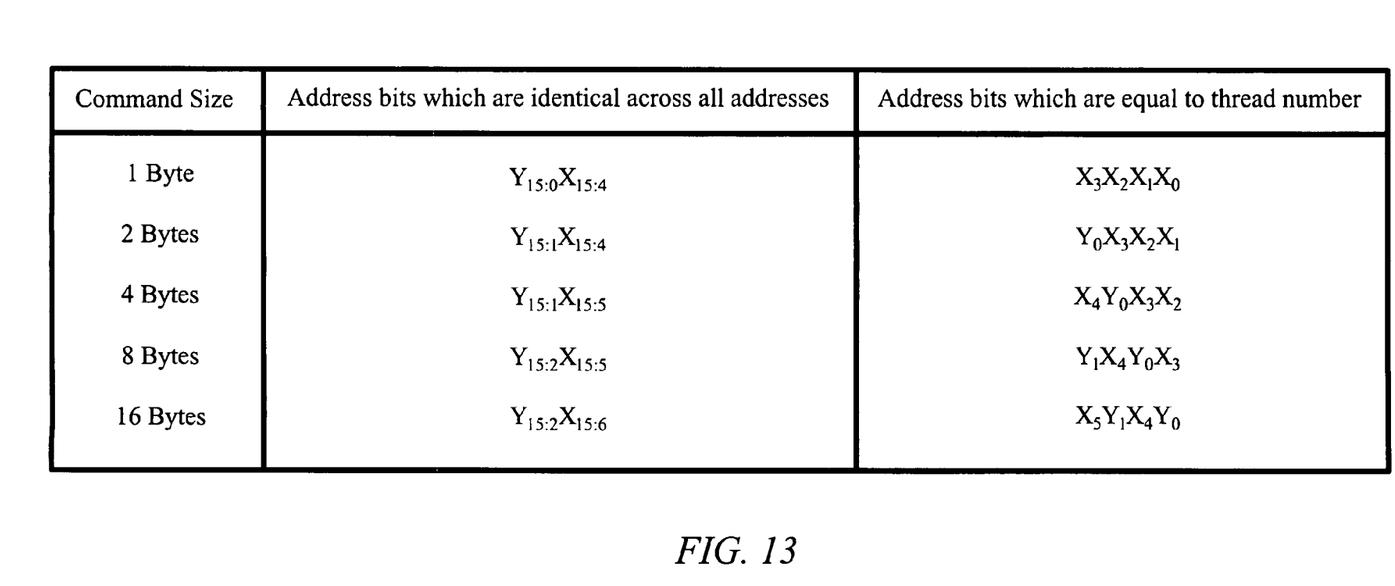
FIG. 13 is a table illustrating coalesce check rules for different memory command sizes for a block-linear memory layout in accordance with one embodiment of the present invention.

FIG. 13 illustrates an exemplary block-linear layout coalesce check. As previously described, address registers for block-linear layout are treated as a two-dimensional coordinates instead of a linear byte address. The lower 16-bits of the address register are treated as the x coordinate whereas the upper 16 bits are treated as the y coordinate. This corresponds to treating x coordinate bits X0 through X15 as equal to bits A0 through A15, respectively. Similarly, y coordinate bits Y0 and Y15 are treated as equal to bits A16 through A31, respectively. For an embodiment with sixteen threads, the sixteen parallel addresses of a load/store command are coalescable if the following two conditions are satisfied: 1) a subset of the address bits are identical across all sixteen addresses; and 2) a subset of the address bits, treated as a binary integer, are equal to the thread number associated with the address.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A multiprocessor graphics processing apparatus, comprising:

an array of streaming processors, said array of streaming processors supporting a group of parallel execution threads operating as a cooperative thread array in which the group of parallel execution threads execute concurrently on a data block to execute a program in parallel with each individual thread in the group assigned an element within the data block, the group of parallel execution threads issuing groups of simultaneous parallel memory requests on individual clock cycles; and a memory controller receiving said groups of simultaneous parallel memory requests and issuing memory requests to a memory on the behalf of said array of streaming processors, the memory controller performing at least one coalesce check to determine the largest number of memory requests for the parallel execution threads that can be accessed in parallel via a single memory access to a common memory page;

said memory controller coalescing simultaneous memory requests capable of being serviced in a single memory access from a region of memory addresses proximate to each other on the page of said memory to improve memory transfer efficiency, said memory controller issuing a sequence of memory accesses for individual memory requests that cannot be coalesced.

2. The multiprocessor graphics processing apparatus of claim 1, wherein said region of memory addresses are within a substantially contiguous region of said page of said memory in a graphics memory format in which a spatial relationship in the memory address space of individual memory pages is organized to correspond to a spatial relationship of graphics data processed by the graphics processing apparatus.

3. The multiprocessor graphics processing apparatus of claim 1, wherein said region of memory addresses are disposed in a row of addresses of a pitch memory layout having a plurality of rows, said pitch layout corresponding to a graphics memory format having a spatial relationship in the memory address space of individual memory pages organized to correspond to a spatial relationship of graphics data processed by the graphics processing apparatus.

4. The multiprocessor graphics processing apparatus of claim 2, wherein said region of memory addresses are disposed within a block of a block-linear memory layout organized as an array of blocks, each block further including a plurality of rows, said block-linear layout corresponding to a graphics memory format having a spatial relationship in the memory address space of individual memory pages organized to correspond to a spatial relationship of graphics data processed by the graphics processing apparatus.

5. The multiprocessor graphics processing apparatus of claim 4, wherein memory requests are coalesced to a contiguous region within said block.

6. The multiprocessor graphics processing apparatus of claim 5, wherein said region of contiguous memory addresses is disposed in a sub-block of said block.

7. The multiprocessor graphics processing apparatus of claim 1, wherein a first portion of a memory address corresponds to an address range within a contiguous region of memory on a memory page and a second portion of the memory address corresponds to a byte offset required for concurrently executing threads to be non-overlapping and proximate to each other.

8. The multiprocessor graphics processing apparatus of claim 7, wherein said memory controller coalesces individual memory requests that are aligned to memory interface transfer boundaries.

9. The multiprocessor graphics processing apparatus of claim 1, wherein said memory controller performs intra-burst coalescing in which individual memory request are coalesced up to a minimum efficient transfer size for a burst.

10. The multiprocessor graphics processing apparatus of claim 9, wherein said minimum efficient transfer size corresponds to a bus width multiplied by a burst size.

11. A multiprocessor graphics system, comprising:

a graphics memory organized with at least one graphics memory format having a spatial relationship in the memory address space of individual memory pages organized to correspond to a spatial relationship of graphics data processed by said multiprocessor graphics system;

a memory access unit for accessing said graphics memory, said memory access unit having at least one fixed memory transfer size for accessing said graphics memory;

an array of streaming processors, said array of streaming processors supporting a group of parallel execution threads operating as a cooperative thread array in which the group of parallel execution threads execute concurrently on a data block to execute a program in parallel with each individual thread in the group assigned an element within the data block, said group of parallel execution threads issuing groups of simultaneous parallel memory requests on individual clock cycles;

a memory controller receiving said groups of simultaneous parallel memory requests and issuing memory requests to said memory access unit on the behalf of said array of processors;

coalesce logic associated with said memory controller to determine the largest number of memory requests for the parallel execution threads that can be accessed in parallel via a single memory access to a common memory page, said coalesce logic performing a coalesce check in which addresses of a group of simultaneous parallel memory requests are checked for address information indicative of two or more members of said group of simultaneous parallel memory requests lying in a region of memory addresses on one memory page proximate to each other in said at least one graphics memory format, said memory controller coalescing each of said groups of simultaneous memory requests that pass said coalesce check and performing a sequence of memory accesses for individual memory requests that fail said coalesce check.

12. The multiprocessor graphics system of claim 11, wherein said region of memory addresses on one memory page is substantially contiguous.

13. The multiprocessor graphics system of claim 12, wherein said region of memory addresses is a row of addresses of a pitch memory layout having a plurality of rows.

14. The multiprocessor graphics system of claim 12, wherein said region of memory addresses is a block within a block-linear memory layout organized as an array of blocks, each block further comprising a plurality of rows.

15. The multiprocessor graphics system of claim 11, wherein said memory controller performs intra-burst coalescing in which individual memory requests are coalesced up to a minimum efficient transfer size for a burst.

16. The multiprocessor graphics system of claim 12 wherein a first portion of a memory address corresponding to an address range within a contiguous region of memory on a memory page, a second portion corresponding to a byte offset required for concurrently executing threads to be non-overlapping and proximate to each other.

* * * * *